(No Model.) 2 Sheets—Sheet 1.
W. W. NISBET.
FOOT REST FOR BICYCLES.
No. 588,873. Patented Aug. 24, 1897.
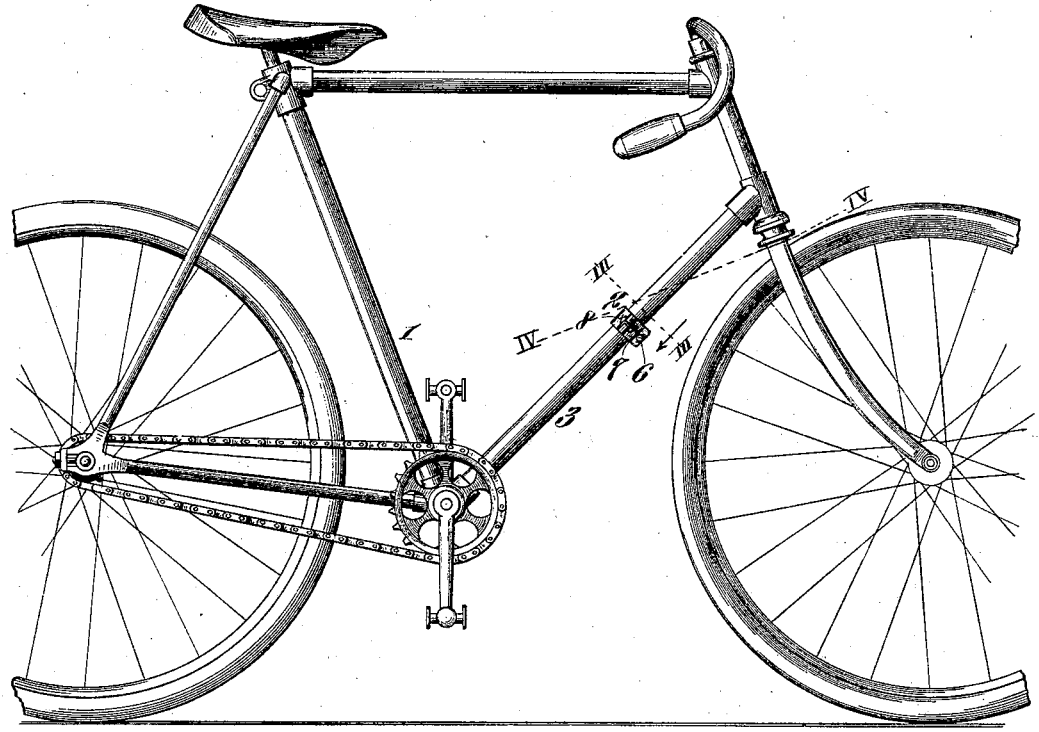
*Fig. I.*
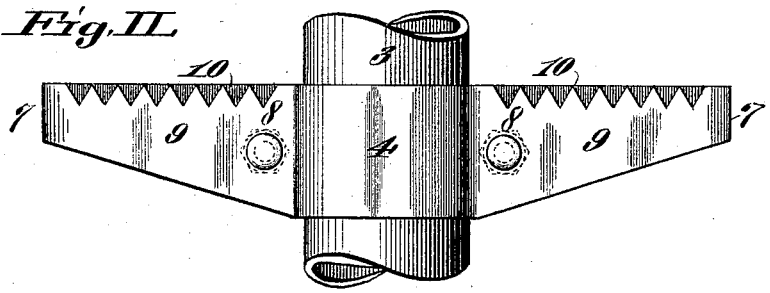
*Fig. II.*
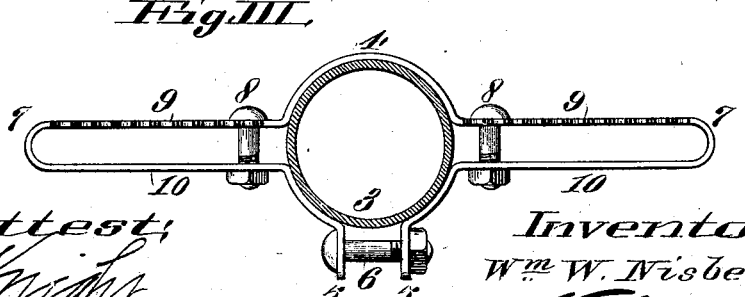
*Fig. III.*
Attest:
E. S. Wright
Stanley Stoner
Inventor:
Wm. W. Nisbet.
By Knight Bro.
Attys (No Model.) 2 Sheets—Sheet 2.
W. W. NISBET.
FOOT REST FOR BICYCLES.
No. 588,873. Patented Aug. 24, 1897.
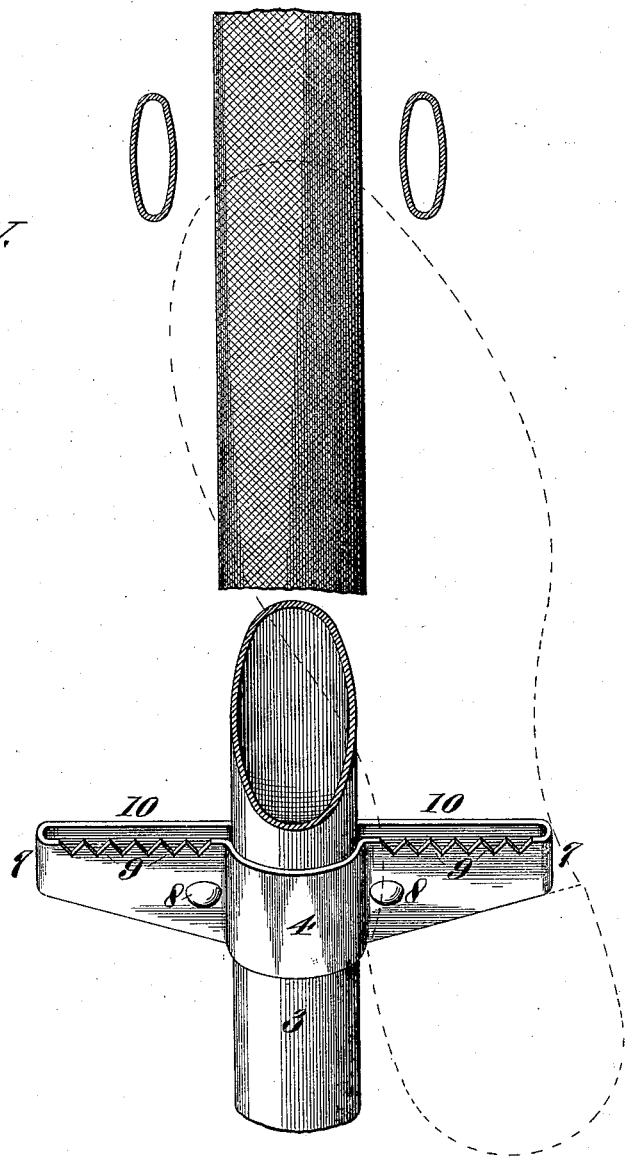
Fig. IV.
Attest:
E. S. Knight
N. Finley
Inventor:
W. W. Nisbet
By Knight Bro
attys

UNITED STATES PATENT OFFICE.

WILLIAM W. NISBET, OF ST. LOUIS, MISSOURI.

FOOT-REST FOR BICYCLES.

SPECIFICATION forming part of Letters Patent No. 588,873, dated August 24, 1897.

Application filed June 8, 1896. Serial No. 594,680. (No model.)

*To all whom it may concern:*

Be it known that I, WILLIAM W. NISBET, a citizen of the United States, and a resident of the city of St. Louis, in the State of Missouri, have invented a certain new and useful Improvement in Foot-Rests for Bicycles, of which the following is a full, clear, and exact description, reference being had to the accompanying drawings, forming part of this specification.

My invention relates to a foot-rest for bicycles so constructed and applied that it will serve both as a rest for the feet in coasting and also when the feet are applied to the front wheel to brake or retard the movement of the machine.

My invention consists in features of novelty hereinafter fully described, and pointed out in the claim.

Figure I is a side view of a bicycle provided with my foot-rest. Fig. II is an enlarged view showing part of the frame of the machine and showing the foot-rest in elevation, looking at it from the rear of the machine. Fig. III is a section taken on line III III, Fig. I, looking at the foot-rest from the front of the machine. Fig. IV is a section taken on the line IV IV, Fig. I, showing the foot-rest in elevation, looking at it from the rear of the machine.

Referring to the drawings, 1 represents a bicycle of any suitable construction.

I have shown my invention applied to a bicycle having the ordinary diamond frame, but the invention may be applied to bicycles having other forms of frames.

2 represents my foot-rest. It is applied to the frame of the machine and is so located with relation to the front wheel that while the rider's feet are supported on the rests the soles of the feet may be pressed against the tire of the front wheel to brake or retard the movement of the machine. I have shown the attachment secured to the front part 3 of the frame, as this is where it would be applied in the diamond form of frame. The attachment itself consists of a socket 4, that embraces the frame and which is provided with outturned lugs 5 to receive a tightening-bolt 6. Extending laterally from the socket are the arms 7, upon which the feet are placed. These arms are in the form of loops and are provided with transverse bolts 8, which may be tightened up to assist the bolt 6 in clamping the attachment to the frame. The upper edge of the side 9 of each arm 7 is serrated or provided with teeth to prevent the slipping of the foot on the rest, while the side 10 of each arm is left smooth.

The under side of each arm is beveled off, as shown in Figs. II and IV, so as to taper upwardly from the frame. The object of this is to form a bearing for the inner face of the heel of the shoe when the toe of the shoe is pressed against the tire to brake the wheel. In braking the rider throws the toe of his foot upwardly and inwardly to get it on the tire, and as he does so the inner face of the heel of his shoe assumes a position parallel to the bevel of the under side of the rest, and as the heel comes against this beveled surface, as shown in Fig. IV, it obtains a firm bearing that will prevent any possibility of the toe of the foot being drawn by the wheel in between the latter and the head of the fork, thus avoiding danger of an accident not unfrequently met with while coasting and using the foot as a brake. By thus applying the foot-rest to the frame of the machine the attachment can be utilized as a rest not only while coasting, but also when applying the feet to the front wheel to retard the movement of the machine, as stated.

I claim as my invention—

In a bicycle, a foot-rest attachment secured to the frame of the machine in proximity to the front wheel, each arm of said rest having an inner serrated and an outer smooth side, substantially as and for the purpose set forth.

W. W. NISBET.

In presence of—
 E. S. KNIGHT,
 STANLEY STONER.